(12) United States Patent
Sloderbeck et al.

(10) Patent No.: US 11,667,095 B2
(45) Date of Patent: Jun. 6, 2023

(54) POWDER PACKING METHODS AND APPARATUS

(71) Applicant: General Electric Company, Schenectady, NY (US)

(72) Inventors: Michelle Lynn Sloderbeck, West Chester, OH (US); Christopher Hall, West Chester, OH (US); Laura Banks, West Chester, OH (US); Tim Murphy, West Chester, OH (US); David Ploetz, West Chester, OH (US); Zachary Fieldman, Marina del Ray, CA (US); Christopher C. Chapman, Auburn, AL (US); Emily Bautista, Florence, KY (US); MacKenzie Ryan Redding, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/749,823

(22) Filed: May 20, 2022

(65) Prior Publication Data
US 2022/0274166 A1 Sep. 1, 2022

Related U.S. Application Data

(62) Division of application No. 15/599,169, filed on May 18, 2017, now Pat. No. 11,351,605.

(51) Int. Cl.
*B22F 3/093* (2006.01)
*B22F 3/03* (2006.01)
*B33Y 40/00* (2020.01)
*B33Y 80/00* (2015.01)
*B33Y 10/00* (2015.01)
*B33Y 30/00* (2015.01)
*B30B 11/02* (2006.01)
(Continued)

(52) U.S. Cl.
CPC .............. *B30B 11/022* (2013.01); *B22F 3/03* (2013.01); *B22F 3/093* (2013.01); *B22F 12/30* (2021.01); *B22F 12/37* (2021.01); *B22F 12/90* (2021.01); *B33Y 10/00* (2014.12); *B33Y 30/00* (2014.12); *B33Y 40/00* (2014.12); *B33Y 40/10* (2020.01); *B33Y 80/00* (2014.12); *B22F 10/28* (2021.01); *B22F 2999/00* (2013.01)

(58) Field of Classification Search
CPC ...................................................... B22F 3/093
See application file for complete search history.

(56) References Cited

U.S. PATENT DOCUMENTS

| 2,174,348 A | 9/1939 | Damond |
| 2,957,608 A | 10/1960 | Wahl |

(Continued)

FOREIGN PATENT DOCUMENTS

| CN | 2085826 U | 10/1991 |
| CN | 1216961 A | 5/1999 |

(Continued)

*Primary Examiner* — Anthony M Liang
(74) *Attorney, Agent, or Firm* — Dority & Manning, P.A.

(57) ABSTRACT

The present disclosure generally relates to powder packing for additive manufacturing (AM) methods and systems. Conventional powder packing methods are manual and non-standardized, and they result in operator fatigue and potentially product inconsistencies. Powder packing according to the present disclosure improves standardization and reduces turnaround time, with the potential to lower the cost of AM.

20 Claims, 7 Drawing Sheets

(51) Int. Cl.
   *B22F 12/00* (2021.01)
   *B33Y 40/10* (2020.01)
   *B22F 12/30* (2021.01)
   *B22F 12/37* (2021.01)
   *B22F 12/90* (2021.01)
   *B22F 10/28* (2021.01)

(56) References Cited

U.S. PATENT DOCUMENTS

| | | | |
|---|---|---|---|
| 3,033,069 | A | 5/1962 | Bohlman et al. |
| 3,591,862 | A | 7/1971 | Winston |
| 3,791,558 | A | 2/1974 | Katusha |
| 4,198,166 | A | 4/1980 | Tuns |
| 4,450,983 | A | 5/1984 | Goodrich |
| 4,863,538 | A | 9/1989 | Deckard |
| 5,460,758 | A | 10/1995 | Langer et al. |
| 6,209,758 | B1 | 4/2001 | Arslanouk et al. |
| 6,460,595 | B1 | 10/2002 | Benz et al. |
| 6,554,600 | B1 | 4/2003 | Hofmann et al. |
| 7,828,022 | B2 | 11/2010 | Davidson et al. |
| 8,393,497 | B2 | 3/2013 | Fontaine et al. |
| 9,022,063 | B2 | 5/2015 | Powell |
| 2004/0003866 | A1 | 1/2004 | Rocchio et al. |
| 2007/0295440 | A1 | 12/2007 | Stacker et al. |
| 2008/0257450 | A1 | 10/2008 | Rink |
| 2011/0223349 | A1 | 9/2011 | Scott |
| 2012/0223462 | A1 | 9/2012 | Eriksson et al. |
| 2014/0010908 | A1 | 1/2014 | Matsumoto et al. |
| 2014/0348969 | A1 | 11/2014 | Scott |
| 2016/0059314 | A1 | 3/2016 | Ljungblad et al. |
| 2016/0061381 | A1 | 3/2016 | Kotliar |
| 2016/0075059 | A1 | 3/2016 | Williams |
| 2016/0096945 | A1 | 4/2016 | Farmer et al. |
| 2016/0158962 | A1 | 6/2016 | Balistreri et al. |
| 2016/0193696 | A1 | 7/2016 | McFarland et al. |
| 2016/0332371 | A1 | 11/2016 | Staroselsky et al. |
| 2016/0346896 | A1 | 12/2016 | Tian et al. |
| 2018/0056387 | A1 | 3/2018 | Saharan, III et al. |

FOREIGN PATENT DOCUMENTS

| | | |
|---|---|---|
| CN | 1775630 A | 5/2006 |
| CN | 201317037 Y | 9/2009 |
| CN | 202539571 U | 11/2012 |
| CN | 103410139 A | 11/2013 |
| CN | 103635296 A | 3/2014 |
| CN | 203695955 U | 7/2014 |
| CN | 204527685 U | 8/2015 |
| CN | 105324533 A | 2/2016 |
| CN | 205309296 U | 6/2016 |
| CN | 205400083 U | 7/2016 |
| CN | 205414417 U | 8/2016 |
| CN | 106625990 A | 5/2017 |
| DE | 102012008664 A1 | 11/2013 |
| EP | 0188820 B1 | 8/1989 |
| EP | 2191922 B1 | 1/2011 |
| EP | 2463081 A1 | 6/2012 |
| EP | 3096906 A1 | 11/2016 |
| JP | 2000336403 A | 12/2000 |
| WO | WO2015112422 A1 | 7/2015 |

POWDER PACKING METHODS AND APPARATUS

CROSS-REFERENCE TO RELATED APPLICATIONS

This application is a division of U.S. application Ser. No. 15/599,169, filed on May 18, 2017, titled "POWDER PACKING METHODS AND APPARATUS", the contents of which is herein incorporated in its entirety by reference.

INTRODUCTION

The present disclosure generally relates to powder packing methods and apparatuses for use in powder-based additive manufacturing (AM) methods and systems.

BACKGROUND

AM or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation, such as a laser beam, to sinter or melt a powdered metal material, creating a solid three-dimensional object. Powder-based methods such as direct metal laser melting (DMLM) and selective laser melting (SLM) have been used to produce objects for a variety of industries.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by a powder reservoir 126. The powder reservoir is also sometimes referred to as the powder dosing chamber. The powder is spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material.

Prior attempts to pack powder into the powder reservoir, or dosing chamber, have focused on leveling the bulk powder cone within the chamber. FIGS. 2-3 show two systems described in German Patent Application DE 102012008664 A1. In FIG. 2, the cross-section of the cover plate 215 is adapted to the internal cross-section of the dosing chamber 203, which allows it to be placed into the dosing chamber 203. In this way, it can press the bulk cones in the interior of the dosing chamber, while avoiding excess powder being pushed out over the edge region of the dosing chamber when the cover plate flattens the bulk cone. Vibration can be introduced into the cover plate 215. In order to smooth the surface of the building material, it is possible to provide vibration elements on the cover plate 215. As soon as the uppermost part of the bulk cone has been removed due to the vibrating cover plate 215, the cover plate 215 is further inserted into the dosing chamber 203 until the contact with the bulk cone again occurs. This allows the bulk cone to be graduated step by step.

FIG. 3 shows an alternative where a plurality of gas supply elements 318 are arranged on the underside of the cover plate 315. The gas feed elements 318 have a lance shape so that they can be immersed in the bulk cone 317 formed from the building material. By introducing the gas into the gas supply elements 318, the bulk cone 317 is whirled up and is thereby buried. For pressure compensation, an opening, which is sealed with a filter, can be located in the cover plate 315, which opening seals the dosing chamber 303 in a powder-tight manner. Therefore, only the gas introduced into the dosing chamber 303 can leave the dosing chamber 303, but not the construction material 305. The gas supply elements 318 are arranged with a particular advantage in a circular manner; they can also consist of a plurality of concentric circles. The center of these circles is the center of the outlet cone 316, the circle or the circles of gas supply elements 318 are arranged in such a way that respectively below the opening of the cover plate 315 through which the building material 305 falls into the dosing chamber 303.

Such methods along with known manual powder packing methods, e.g., with a trowel, can result in non-uniform packing density within the powder reservoir. Moreover, these techniques are often slow and can lead to operator fatigue and variation between batches. Accordingly, improved systems and method are needed to quickly and consistently pack powder into the powder reservoir. Uniform packing density can also enable operators to better plan for how much powder is needed; variability can lead to process disruption and wastefulness.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some aspects, the present disclosure is directed to a method for preparing a powdered metal to be used in additive manufacturing, comprising steps a) to c). Step a) involves adding a first amount of powder to a powder reservoir. Step b) involves inserting a packing tool into the powder reservoir to compact the powder, wherein the packing tool comprises a sleeve and a vibration source. Step c) involves vibrating the packing tool to compact the powder in the powder reservoir and form a layer of compacted powder. In some aspects, the method further comprises adding a second amount of powder over the layer of compacted powder. In some aspects, the powder reservoir comprises a bottom plate, and the packing tool comprises a pressure sensor. In some aspects, vibrating the packing tool to compact the powder comprises vibrating the packing tool and simultaneously raising the bottom plate at a velocity, until a predetermined pressure limit is reached. In some aspects, the method further comprises, before adding the first amount of powder into the powder reservoir, lowering the bottom plate. In some aspects, the packing tool is a top plate comprising the at least one mechanical member extending downward from the top plate. In some aspects, the method further comprises raising the top plate and rotating the top plate by 90°. In some aspects, the method further comprises lowering the top plate into the powder reservoir. In some aspects, the method further comprises repeating the steps of: vibrating at least the at least one mechanical member and simultaneously raising the bottom plate at a velocity, until a predetermined pressure limit is reached; raising the top plate; rotating the top plate by 90°; and lowering the top plate into the powder reservoir, until the top plate has rotated by a total of 360° relative to its original position. In some aspects, the method further comprises, before step a), feeding the powder into a funnel and allowing the powder to flow from the funnel through one or more tubes into the powder reservoir for an amount of time. In some aspects, the method further comprises, before allowing the powder to flow from the funnel through the one or more tubes into the powder reservoir, lowering the bottom plate. In some aspects, the method further comprises, before allowing the powder to flow from the funnel through the one or more tubes into the powder reservoir, locking the top plate location over the top of the powder reservoir. In some aspects, the method further comprises, before allowing the powder to flow from the funnel through one or more tubes into the powder reservoir, the step of raising the bottom plate until either the pressure sensor senses a powder packing limit, or the at least one mechanical member extending downward from the top plate contacts the bottom plate. In some aspects, the packing tool is inserted longitudinally into the powder reservoir.

In some aspects, the present disclosure is directed to an apparatus for packing a powdered metal, comprising a vibration source; and at least one mechanical member characterized by a variable frequency and variable intensity vibration; wherein the member is a sleeve configured to envelop at least a portion of the vibration source; and wherein a clamp engages a portion of the sleeve. In some aspects, the vibration source is electrically powered. In some aspects, the sleeve is removable from the vibration source. In some aspects, the apparatus further comprises a top plate comprising the at least one mechanical member extending downward. In some aspects, the top plate further comprises a pressure sensor. In some aspects, the at least one mechanical member comprises a pressure sensor.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to automated methods of preparing powder to be used in additive manufacturing. Such methods differ from conventional powder preparation methods by removing manual force and non-standardized equipment and procedures. By automating the powder packing process, the present disclosure improves process standardization, reduces physical wear on the operator, and improves machine turnaround time (e.g., by minimizing preparation time).

Figure 1:
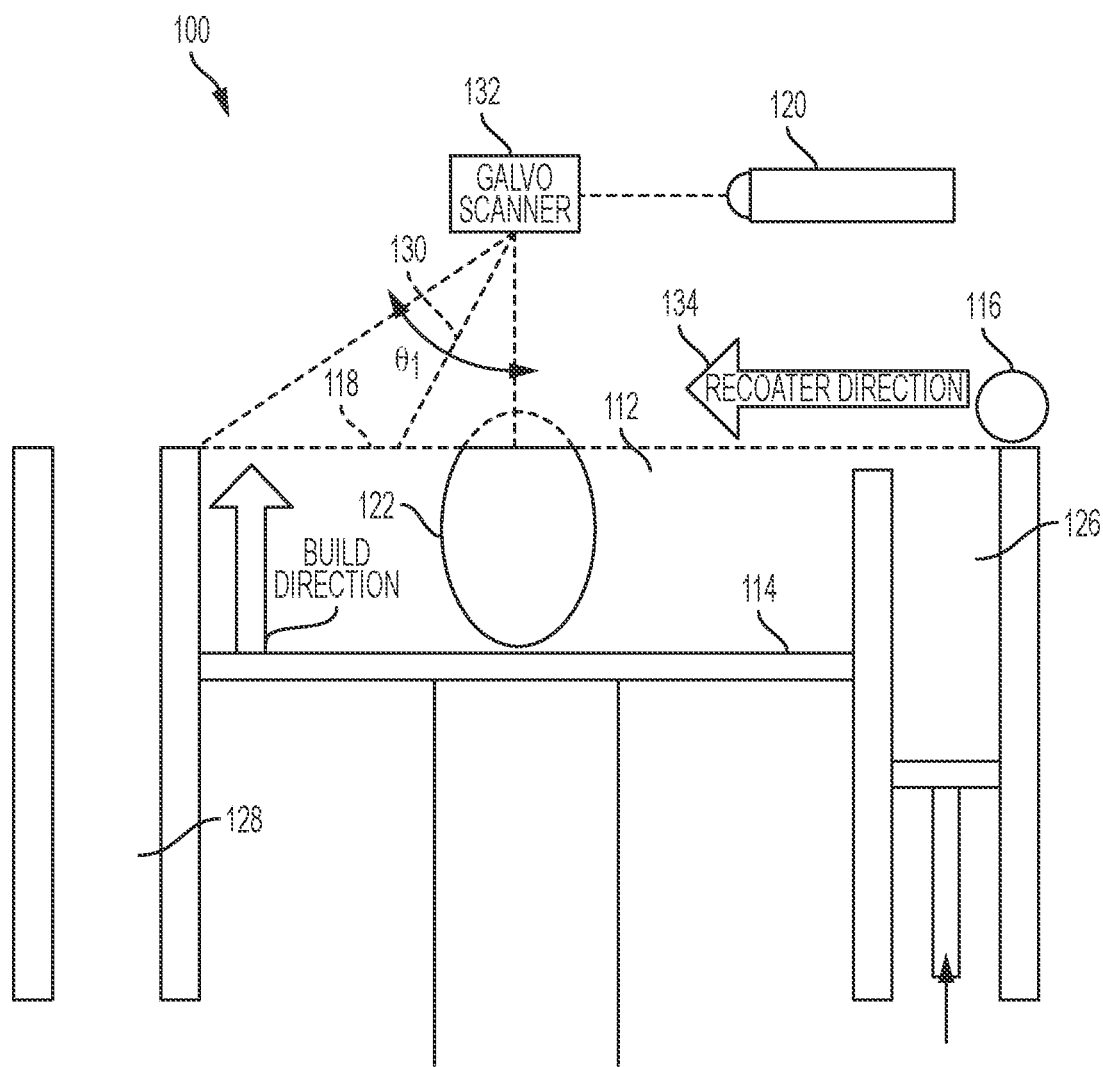
FIG. 1 shows an exemplary conventional powder bed apparatus for additive manufacturing.
Figure 2:
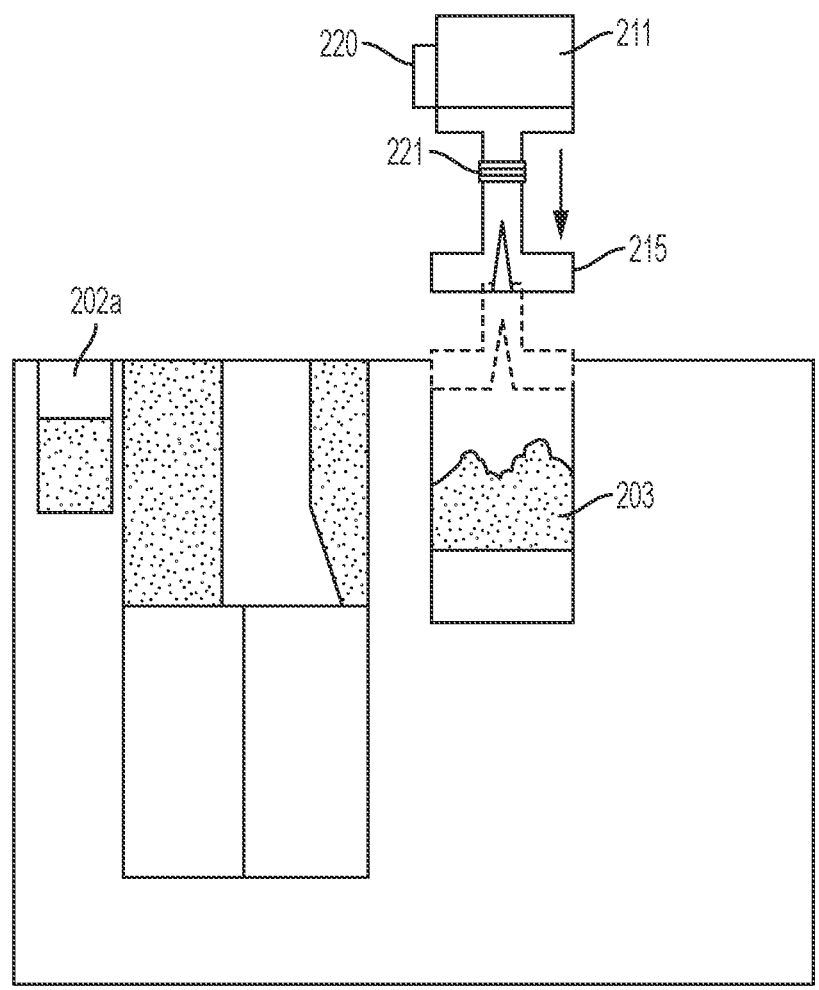
FIG. 2 shows a conventional powder packing apparatus including a cover plate.
Figure 3:
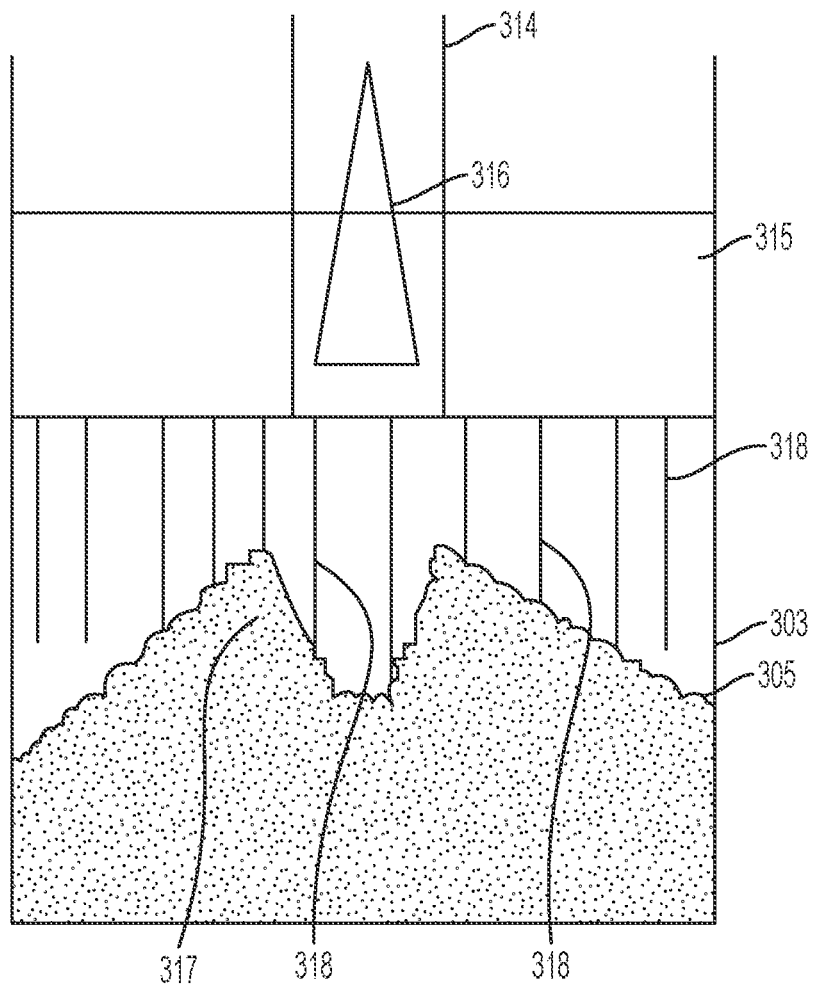
FIG. 3 shows a conventional powder packing apparatus including gas supply elements.
Figure 4A:
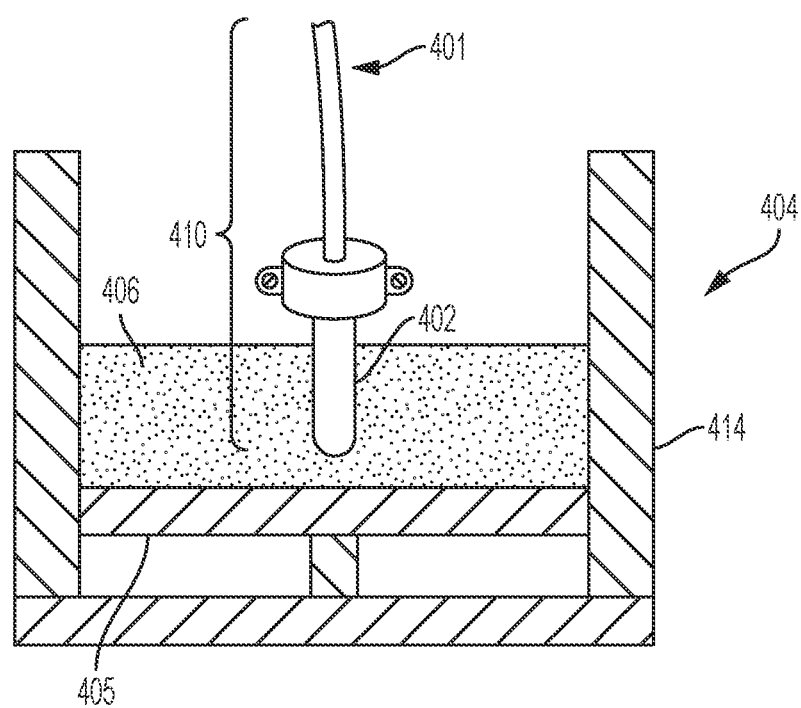
FIG. 4A shows an example of an apparatus for powder packing according to the present disclosure.

FIG. 4A shows an example of an apparatus for use according to the present disclosure. A first amount of powder 406 is added to powder reservoir 404. In some aspects, powder reservoir may comprise a bottom plate 405. The powder reservoir 404 may be defined by one or more sidewalls 414 and a bottom plate 405. In one aspect, the bottom plate 405 moves in a vertical direction. That movement may be facilitated in any known manner. In some aspects, bottom plate 405 is an external plate added to the powder based additive manufacturing apparatus to further limit the size of the powder reservoir 404.

In some aspects, bottom plate 405 may be lowered into a powder reservoir 404 before adding powder to reservoir 404. Packing tool 410, comprising a vibration source 401 and at least one mechanical member 402 extending downward, may be inserted into the powder-containing reservoir 404 and vibrated, to compact the powder in the reservoir 404 and form a layer of compacted powder (not shown). The at least one mechanical member 402 is a sleeve configured to envelop vibration source 401. The outer surface of the sleeve is made from a metal selected from cobalt chrome, stainless steels, tooling steel, maraging steel, aluminum alloys, nickel alloys, copper alloys, or titanium alloys. In some aspects, the outer surface of the sleeve is made of a metal that is the same as the powdered metal used with the apparatus, to prevent contamination. In some aspects, the packing tool 410 may further comprise one or more pressure sensors (not shown). The apparatus may further comprise a vibration isolation ring (not shown) around the at least one mechanical member 402, and the vibration isolation ring may help damp and/or isolate vibrations and localize them to the packing tool 410. In some aspects, the sleeve may be removable from the vibration source and interchangeable. After compacting the first amount of powder, a second amount of powder may be added over the layer of compacted powder, and the process may be repeated.

Figure 4B:
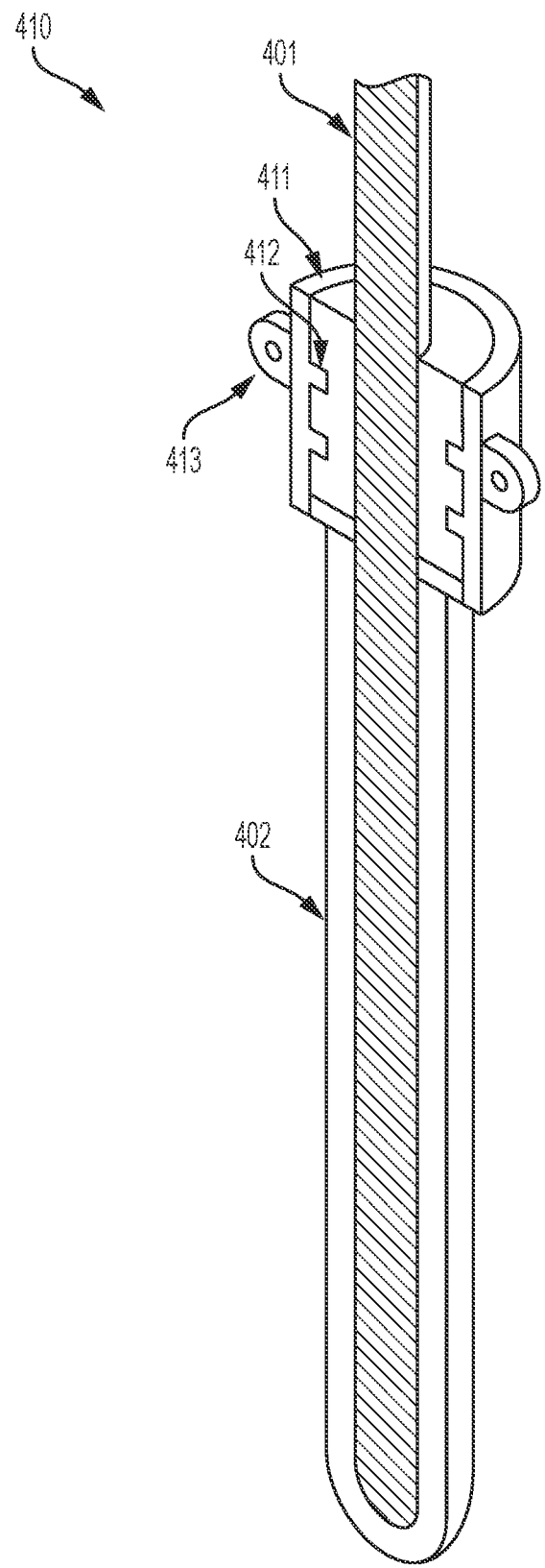
FIG. 4B shows a cross-sectional view of an exemplary packing tool for use with the present disclosure.

FIG. 4B shows a longitudinal cross-sectional view of an exemplary packing tool 410 for use with the apparatus and method of the present disclosure. Packing tool 410 comprises a vibration source 401 and at least one mechanical member 402, which is a sleeve configured to envelop vibration source 401. The at least one mechanical member 402 may be configured to envelop vibration source 401 by clamp 411, which may in turn comprise one or more gripping mechanisms 412, such as one or more teeth or lips, which may be complementary to one or more gripping mechanisms (not shown) on the sleeve, and one or more fasteners 413, such as screws or nuts and bolts. In some aspects, clamp 411 comprises one or more gripping mechanisms 412, such as teeth, configured to engage one or more gripping mechanisms of the sleeve. In some aspects, packing tool 410 is inserted, immersed, or submerged into powder-containing reservoir 404 (FIG. 4A) to a depth of no greater than the length of the at least one mechanical member 402. In some aspects, the packing tool 410 is inserted, immersed, or submerged into powder-containing reservoir 404 (FIG. 4A) to a depth greater than the length of the at least one mechanical member 402. Clamp 411 may be the made of the same or a different material than the metal powder. If the packing tool 410 is to be inserted, immersed, or submerged into the powder-containing reservoir 404 to a depth greater than the length of the at least one mechanical member 402, then it is preferable that the claim 411 is made of the same material as the metal powder.

The vibration source 401 may be any suitable source and may be commercially available. Non-limiting examples of suitable vibration sources include, but are not limited to, Dewalt pencil vibrators and concrete vibrators.

Figure 4C:
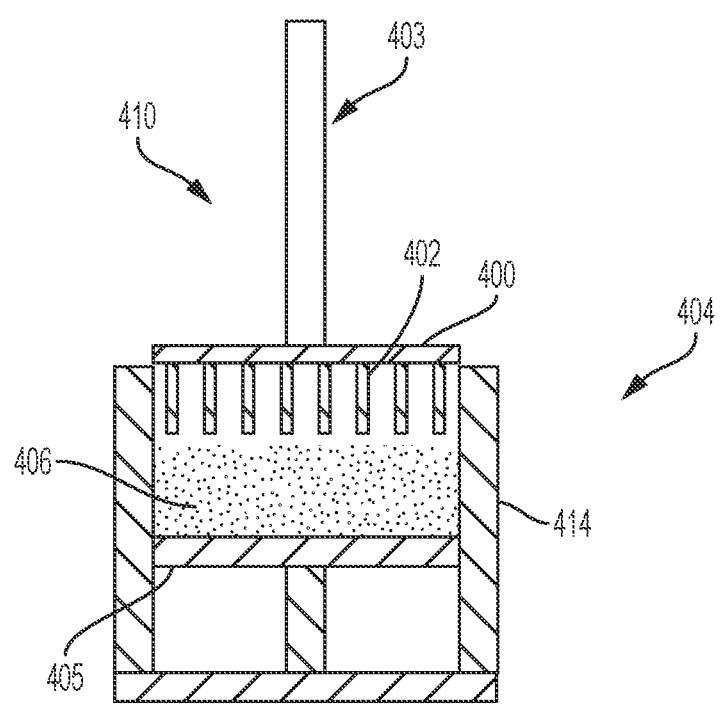
FIG. 4C shows an alternate example of an apparatus for powder packing according to the present disclosure.

FIG. 4C shows an alternate example of an apparatus for use according to the present disclosure. In some aspects, packing tool 410 comprises top plate 400 and at least one mechanical member 402 that is a sleeve configured to envelop a vibration source (not shown). A first amount of powder 406 is added to powder reservoir 404, which may comprise a bottom plate 405. In some aspects, the powder may be added via a funnel (not shown) and one or more tubes 403 running from the funnel. In some aspects, the powder may be allowed to flow from the funnel through one or more tubes 403 into the powder reservoir 404 for an amount of time. In some aspects, the one or more tubes 403 may be open or closed. In some aspects, bottom plate 405 may be lowered into a powder reservoir 404 before allowing powder to flow from the funnel through one or more tubes into the reservoir 404. Packing tool 410 may be inserted into the powder-containing reservoir 404 and vibrated, to compact the powder in the reservoir 404 and form a layer of competed powder (not shown). The apparatus may further comprise a vibration isolation ring (not shown) around the one or more tubes 403, and the vibration isolation ring may help damp and/or isolate vibrations and localize them to the packing tool 410. After compacting the first amount of powder, a second amount of powder may be added over the layer of compacted powder, and the process may be repeated.

Packing tool 410 may further comprise one or more pressure sensors (not shown). In some aspects, the location of the top plate 400 or the packing tool 410 may be locked over the top of powder reservoir 404 before allowing powder to flow from the funnel (not shown) through the one or more tubes 403 into the powder reservoir 404. In some aspects, the one or more tubes 403 run from the funnel to the center of the top plate 400. In some aspects, the one or more tubes 403 run from the funnel to the center and one or more corners of the top plate 400. In some aspects, before allowing the powder to flow from the funnel through the one or more tubes 403 into the powder reservoir 404, the bottom plate 405 may be raised until either the one or more pressure sensors sense a powder packing limit or the at least one mechanical member 402 extending downward from top plate 400 contact bottom plate 405.

The at least one mechanical member 402 may extend any length; it is within the knowledge of those of ordinary skill in the art to determine appropriate lengths for the at least one mechanical member 402. In some aspects, the at least one mechanical member 402 extends downward from packing tool 410 by a length that is a function of the height of the powder reservoir 404. For example, a taller powder reservoir 404 or a taller powder height may be used with a packing tool 401 with a longer at least one mechanical member 402. For example, the ratio of the height of the powder reservoir 404 to the length of the at least one mechanical member 402 may range from 4:1 to 8:1, or any ratio in between. The at least one mechanical member 402 is preferably suited to transmit vibration from the packing tool 410 to the underlying powder. In one embodiment, the vibration is transmitted through cylindrical mechanical members 402. The shape of the at least one mechanical member 402 may also be another shape, such as square or rectangular.

The powder reservoir 404 may be of any dimensions suitable for use with the present method and apparatus. In some aspects, the powder reservoir 404 has a rectangular or square base with sidewalls rising from the edges of the base. In some aspects, the powder reservoir 404 has a wall height of no more than 4 feet. In some aspects, the powder reservoir 404 has a wall height of no more than 3 feet. In some aspects, the powder reservoir 404 has a rectangular or square base measuring no less than 1 foot long on at least one side. In some aspects, the powder reservoir 404 has a square base measuring no more than 5 feet long on at least one side.

The at least one mechanical member 402, that is a sleeve configured to envelop a vibration source, may be of any sleeve wall thickness, which is the difference between the outer and inner radii of the mechanical member 402. In some aspects, the at least one mechanical member 402 has a sleeve wall thickness of no greater than 1.5 inches. In some aspects, the at least one mechanical member 402 has a sleeve wall thickness of no less than 0.25 inches.

The at least one mechanical member 402 may comprise any number of mechanical members 402, or any array number. In some aspects, the number of mechanical members 402 is a function of the width and/or depth of the powder reservoir 404. In some aspects, the number of mechanical members 402 is a function of the thickness (outer diameter) of the at least one mechanical member 402.

For example, the smaller the thickness (outer diameter) of the at least one mechanical member 402, the greater the number of mechanical member 402. Without wishing to be bound to any particular theory, it is believed that there may be an attenuation zone around each vibration transmission element that provides improved powder packing capabilities relative to the use of a vibrating plate alone. In addition, the present invention provides improved powder packing without introduction of gas or any other means of powder packing, such as manual packing with a trowel.

Figure 5A:
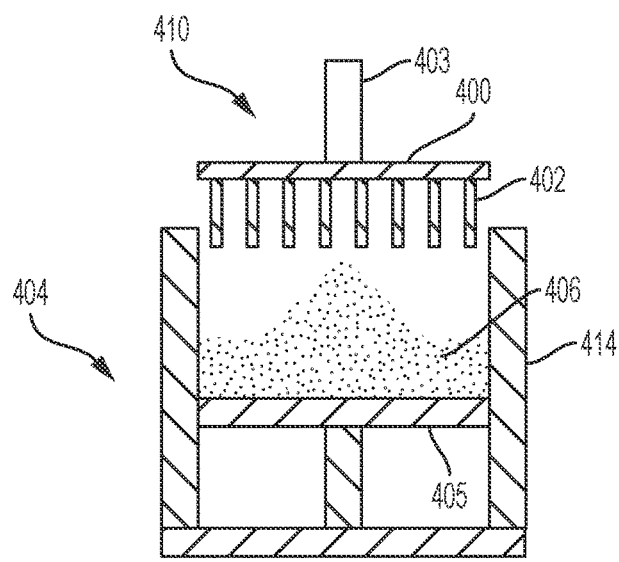
FIGS. 5A-5C show a schematic of a method of powder packing according to the present disclosure.
Figure 5B:
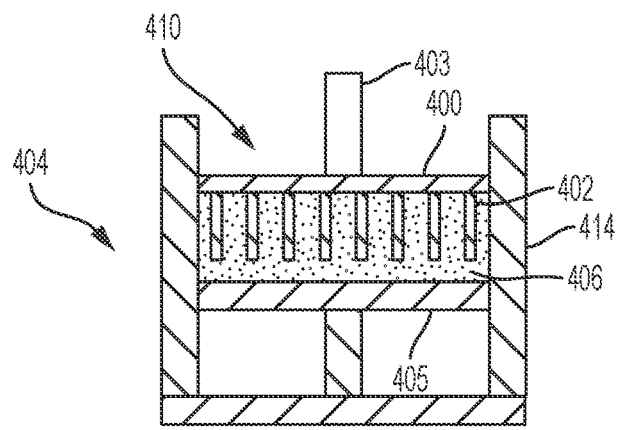
Figure 5C:
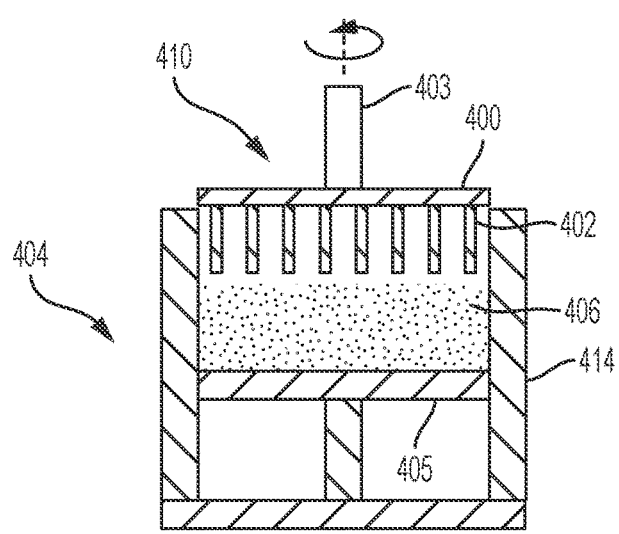

FIGS. 5A-5C show a schematic of steps of using the apparatus of the present disclosure, according to some aspects. In FIG. 5A, packing tool 410 is lowered into powder reservoir 404, which contains a first amount of powder 406, which typically has a bulk powder cone formed by the pouring action. As packing tool 410 is lowered, the at least one mechanical member 402 becomes immersed in the first amount of powder 406 (FIG. 5B). Once immersed to a desired depth, the packing tool 410 is vibrated, and the at least one mechanical member 402 transmits the vibrations down into the powder. In some aspects, the top plate 400 is vibrated while being lowered. In some aspects, the top plate 400 is lowered while the bottom plate 405 is simultaneously raised. The at least one mechanical member 402 may be vibrated while simultaneously raising the bottom plate 405 at a velocity, until a predetermined pressure limit is reached, as detected by the one or more pressure gauges (not shown). In some aspects, the pressure limit and/or the velocity at which the bottom plate 405 is raised may be controlled using a computer. The at least one mechanical member 402 is believed to extend vibration down into the powder between top plate 400 and bottom plate 405. The use of a predetermined pressure limit may improve consistency in powder packing. Vibration may be at any suitable frequency and for any suitable duration of time.

After a suitable or desired vibration duration, the packing tool 410 may be raised out of powder reservoir 404 (FIG. 5C). Packing tool 410 may be raised, rotated by 90°, and lowered into the powder reservoir 404. The steps of vibrating the at least one mechanical member 402 and simultaneously raising the bottom plate 405 at a velocity until a predetermined pressure limit is reached, raising the packing tool 410, rotating the packing tool 410 by 90°, and lowering the packing tool 410 into the powder reservoir 404 may be repeated. In some aspects, the steps pack an amount of powder between top plate 400 and bottom plate 405. In some aspects, the steps may be repeated until the packing tool 410 has rotated by a total of 360° or a multiple thereof relative to its original position. In some aspects, the packing tool 410 is rotated by 360° or a multiple thereof relative to its original position, such that any holes created in the powder by the at least one mechanical member 402 are filled in by powder during or as a result of the rotation(s).

In some aspects, a computer may also be used to control movements of the packing tool 410, initiation of powder feed into a funnel (not shown), initiation of vibration of the at least one mechanical member 402, and raising or lowering of bottom plate 405. Raising and lowering of top plate 400, packing tool 410, and/or bottom plate 405 may be by any suitable distance(s); determining such distance(s) is within the knowledge of those of ordinary skill in the art.

In some aspects, the apparatus comprises a funnel (not shown) one or more tubes 403, a vibration isolation ring (not shown), and packing tool 410, and may be separable from powder reservoir 404. The apparatus may be separable from or joinable to the powder reservoir 404 by any suitable means known to those of ordinary skill in the art.

The apparatus, funnel, one or more tubes 403, vibration isolation ring, packing tool 410, top plate 400, at least one mechanical member 402, powder reservoir 404, bottom plate 405, and one or more pressure sensors may be composed of any suitable materials known in the art, including, but not limited to, cobalt chrome. Preferably, parts that may come into contact with the powder, such as the funnel, one or more tubes 403, packing tool 410, top plate 400, at least one mechanical member 402, one or more pressure sensors, powder reservoir 404, and bottom plate 405, do not contaminate the powder. In addition, the apparatus, funnel, one or more tubes 403, vibration isolation ring, packing tool 410, top plate 400, at least one mechanical member 402, powder reservoir 404, bottom plate 405, and one or more pressure sensors are preferably made of materials that can withstand vibration at the frequency and duration used according to the present disclosure.

The methods and apparatus of the present disclosure may be used with any powder-based additive manufacturing methods and apparatuses, such as DMLM or SLM. The methods and apparatus of the present disclosure may be used with any powder material; preferably, the powder does not react with the material(s) from which the apparatus is made.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A powder packing apparatus for use in a powder-based additive manufacturing system, the powder packing apparatus comprising:
   a vibration source; and
   at least one mechanical member characterized by a variable frequency and variable intensity vibration;
   wherein the at least one mechanical member is a sleeve configured to envelop at least a portion of the vibration source; and
   wherein a clamp engages a portion of the sleeve.

2. The powder packing apparatus of claim 1, wherein the vibration source is electrically powered.

3. The powder packing apparatus of claim 1, wherein the sleeve is removable from the vibration source.

4. The powder packing apparatus of claim 1, further comprising a top plate comprising the at least one mechanical member extending downward from the top plate.

5. The powder packing apparatus of claim 4, wherein the top plate further comprises a pressure sensor.

6. The powder packing apparatus of claim 1, wherein the at least one mechanical member comprises a pressure sensor.

7. The powder packing apparatus of claim 1, wherein the sleeve is made from a metal material.

8. The powder packing apparatus of claim 7, wherein the metal material of the sleeve and a powder material of the powder-based additive manufacturing system are made of a same material.

9. The powder packing apparatus of claim 7, wherein the metal material of the sleeve and a powder material of the powder-based additive manufacturing system are different materials.

10. The powder packing apparatus of claim 7, wherein the metal material comprises cobalt, chrome, stainless steels, tooling steel, maraging steel, aluminum alloys, nickel alloys, copper alloys, or titanium alloys.

11. The powder packing apparatus of claim 1, wherein the clamp comprises one or more gripping mechanisms.

12. The powder packing apparatus of claim 1, wherein the clamp comprises one or more fasteners.

13. The powder packing apparatus of claim 1, wherein the clamp and a powder material of the powder-based additive manufacturing system are made of a same material or are made of different materials.

14. The powder packing apparatus of claim 1, wherein a powder material of the powder-based additive manufacturing system is contained in a reservoir.

15. The powder packing apparatus of claim 14, further comprising a top plate comprising the at least one mechanical member extending downward from the top plate into the reservoir containing the powder material.

16. The powder packing apparatus of claim 14, wherein the reservoir comprises a bottom plate, and wherein the powder packing apparatus comprises a pressure sensor.

17. The powder packing apparatus of claim 14, wherein the sleeve and the powder material comprises cobalt, chrome, stainless steels, tooling steel, maraging steel, aluminum alloys, nickel alloys, copper alloys, or titanium alloys.

18. The powder packing apparatus of claim 13, wherein the clamp comprises one or more gripping mechanisms or one or more fasteners.

19. The powder packing apparatus of claim 14, further comprising a top plate comprising the sleeve and the vibration source extending downward from the top plate into the reservoir.

20. The powder packing apparatus of claim 1, wherein the variable frequency and the variable intensity vibration are controlled by a computer.

* * * * *